(12) United States Patent
Conrad et al.

(10) Patent No.: US 7,225,302 B2
(45) Date of Patent: May 29, 2007

(54) METHOD AND SOFTWARE APPLICATION FOR AVOIDING DATA LOSS

(75) Inventors: Michael Conrad, Reilingen (DE); Dirk Henrich, Wiesloch (DE)

(73) Assignee: SAP AG, Walldorf (DE)

( * ) Notice: Subject to any disclaimer, the term of this patent is extended or adjusted under 35 U.S.C. 154(b) by 408 days.

(21) Appl. No.: 10/721,426

(22) Filed: Nov. 26, 2003

(65) Prior Publication Data
US 2004/0148447 A1    Jul. 29, 2004

Related U.S. Application Data

(60) Provisional application No. 60/429,372, filed on Nov. 27, 2002.

(51) Int. Cl.
*G06F 12/16* (2006.01)
(52) U.S. Cl. .................... 711/152; 711/147; 711/154; 711/156; 711/163; 709/201; 709/213; 710/200; 707/1; 707/9; 707/103 R; 707/200; 707/201
(58) Field of Classification Search ................ 711/152, 711/147, 154, 156, 163; 709/201, 213; 710/200; 707/1, 9, 103 R, 200, 201
See application file for complete search history.

(56) References Cited

U.S. PATENT DOCUMENTS

| 5,689,706 | A | * | 11/1997 | Rao et al. .................... 707/201 |
| 5,764,973 | A | | 6/1998 | Lunceford et al. ............. 707/1 |
| 5,832,487 | A | * | 11/1998 | Olds et al. .................... 707/10 |
| 5,890,153 | A | | 3/1999 | Fukuda et al. ................. 707/8 |
| 5,909,540 | A | * | 6/1999 | Carter et al. ................... 714/4 |
| 5,918,229 | A | * | 6/1999 | Davis et al. .................. 707/10 |
| 6,016,497 | A | | 1/2000 | Suver ..................... 707/103 R |
| 6,029,178 | A | | 2/2000 | Martin et al. ............... 707/201 |
| 6,032,158 | A | | 2/2000 | Mukhopadhyay et al. .. 707/201 |
| 6,408,292 | B1 | | 6/2002 | Bakalash et al. ............... 707/2 |
| 6,463,439 | B1 | | 10/2002 | Dahlberg .................... 707/100 |
| 6,477,597 | B1 | * | 11/2002 | Sorace et al. ............... 710/200 |
| 6,611,837 | B2 | | 8/2003 | Schreiber .................... 707/100 |
| 6,636,875 | B1 | | 10/2003 | Bashant et al. ............. 707/201 |
| 6,671,696 | B1 | | 12/2003 | Holcombe et al. ...... 707/103 R |

(Continued)

OTHER PUBLICATIONS

PCT International Search Report—International Application No. PCT/EP 03/13159 dated Apr. 20, 2004.

(Continued)

*Primary Examiner*—Stephen C. Elmore
*Assistant Examiner*—Daniel Kim
(74) *Attorney, Agent, or Firm*—Finnegan, Henderson, Farabow, Garrett & Dunner, L.L.P.

(57) ABSTRACT

A method consistent with the present invention avoids data loss in a data object replication process. The method includes: creating an electronic data element comprising a first field having an identifier and a second field having a state of the identifier; setting the second field of the data element to a state indicating that the electronic data element may be accessed and assigned; assigning the identifier to one or more data objects; setting a shared lock on the electronic data element; storing the one or more data objects; and upon a commit of the storing of the one or more data objects, removing the shared lock and setting the state of the identifier to indicate that the one or more data objects may be replicated.

19 Claims, 9 Drawing Sheets

U.S. PATENT DOCUMENTS

| | | | | |
|---|---|---|---|---|
| 6,769,124 | B1* | 7/2004 | Schoening et al. | 719/316 |
| 6,823,458 | B1* | 11/2004 | Lee et al. | 726/16 |
| 6,850,938 | B1* | 2/2005 | Sadjadi | 707/8 |
| 6,857,068 | B1* | 2/2005 | Moller et al. | 713/2 |
| 6,862,599 | B2 | 3/2005 | King | 707/100 |
| 2002/0059325 | A1 | 5/2002 | Beizer et al. | 707/203 |
| 2002/0174200 | A1 | 11/2002 | Kozina | 709/220 |
| 2003/0050930 | A1* | 3/2003 | Mosher et al. | 707/9 |
| 2003/0233523 | A1 | 12/2003 | Jamil et al. | 711/144 |
| 2004/0143745 | A1* | 7/2004 | Margolus et al. | 713/176 |
| 2005/0193031 | A1* | 9/2005 | Midgley et al. | 707/200 |

OTHER PUBLICATIONS

Chaudhuri, Surajit, et al., "An Overview of Data Warehousing and OLAP Technology," SIGMOD Record, Association for Computing Machinery, New York, vol. 26, No. 1, Mar. 1997, pp. 65-74.

Ram, Prabhu, et al., "Extracting Delta for Incremental Data Warehouse Maintenance," Data Engineering, 2000, Proceedings of the 16th International Conference, San Diego, CA, Feb. 29-Mar. 3, 2000, pp. 220-229.

Stefani, Helmut, "Datenarchivierung mit SAP," SAP-Info, SAP Ag., Corporate Communications, Walldorf, Germany, May 2002, 27 pages.

PCT International Search Report—International Application No. PCT/EP 03/13157 dated Apr. 20, 2004.

* cited by examiner

METHOD AND SOFTWARE APPLICATION FOR AVOIDING DATA LOSS

RELATED APPLICATIONS

This patent application claims the benefit of priority of U.S. Provisional Application No. 60/429,372, filed Nov. 27, 2002, which is incorporated herein by reference. This patent application is related to a series of other patent applications simultaneously filed with the present application on Nov. 26, 2003. Those other patent applications include U.S. patent application Ser. No. 10/721,348 entitled "METHOD AND SOFTWARE APPLICATION FOR PROCESSING DATA OBJECTS IN BUSINESS APPLICATIONS," U.S. patent application Ser. No. 10/721,898 entitled "COMPUTERIZED REPLICATION OF DATA OBJECTS," and U.S. patent application Ser. No. 10/721,869 entitled "DATA ELEMENT AND STRUCTURE FOR DATA PROCESSING." This patent application and the noted other patent applications have common inventors and are assigned to a common entity.

FIELD OF THE INVENTION

The technical field of this invention is in the area of electronic data processing. More particularly, the invention relates to methods, computer program products and systems for replicating data objects.

BACKGROUND

The replication of data objects is well known to every user of a computer and is a standard procedure that is routinely applied. A special application of replicating data objects is the copying or the archiving process, by which data objects are copied from a source system to a target system for safety and/or performance reasons. In these special applications, the data objects may remain unchanged. However, the more general term "replication" may also comprise processes in which the data objects are changed during the replication process. Such changes may be a consequence of the need to concentrate the amount of data or of a desire of the user of the target system to receive only a particular part of the data object.

In enterprises, so called enterprise resource planning software (ERP) applications are used to control business processes and to manage company information of enterprises of various kinds in any field of technology by means of automatic data processing systems such as computers or computer systems. During the use of such software, a huge amount of data is usually created, which contains important business information contained in data objects. In such an environment a source system may be the computer and software system of the financial and or controlling department, and the target system may be the computer and software system of the management.

In order to keep the management informed about the economic situation in the enterprise, e.g. financial data, posting data may be replicated (transferred under changes such as aggregations or concentrations or copied) from the financial system to the management system. In many ERP applications, the transactions of the enterprise are stored in the computer system independently and at any time. At the same time, there is a need to provide one or more target systems with replicated data. These data replications usually take place less frequently, and in order to reduce the amount of the transferred data volume, only data objects which are new or amended since the previous replication process may be replicated. One method to reach this goal is the time stamp process. In this method, a time stamp is assigned to the data object to be stored in the source system. The time stamp is usually the time at which the data object is stored or a time shortly after the storage process has started. And a replication application, a software application that replicates the data object from the source to the target system, replicates at a particular run data objects whose time stamps are within a particular, predefinable time interval.

However, this method has the disadvantage that the time stamp is not necessarily identical with time of the actual commit of the data base (application), which physically stores/writes the data object on the physical storage means. This discrepancy may cause failures, particularly missing data objects, in the replication process if the replication process takes place at a time between the time stamp and the time of the commit or if the storing and replication processes run parallel. Suppose a time stamp $t_S$, a commit $t_C$, and a replication interval from $t_1$ to $t_2$, where $t_1 < t_S < t_2 < t_C$. In such a time gap, the particular data object is, due to the lacking commit ($t_2 < t_C$), not yet visible for the replication application and will thus not be replicated. During the next replication run with an interval from $t_2$ to $t_3$ the time stamp of that data object is not within the interval because of $t_S < t_2$. This problem is usually defused by using a time $t_2 + \Delta t$ as the upper level of the replication interval and starting the subsequent replication run exactly at $t_2$. A usual length of $\Delta t$ is about 30 min. However, this concept with $\Delta t$ has, on the one hand, the disadvantage that "historical" data objects are replicated if $\Delta t$ is too large and, on the other hand, that data objects are lost if $\Delta t$ is too small. Further, assigning a time stamp is an access on a central resource of the computer and disturbs the parallel storing of the data objects.

SUMMARY

A method consistent with the present invention avoids data loss in a data object replication process. The method comprises: creating an electronic data element comprising a first field having an identifier and a second field having a state of the identifier; setting the second field of the data element to a state indicating that the electronic data element may be accessed and assigned; assigning the identifier to one or more data objects; setting a shared lock on the electronic data element; storing the one or more data objects; and upon a commit of the storing of the one or more data objects, removing the shared lock and setting the state of the identifier to indicate that the one or more data objects may be replicated.

A system consistent with the present invention avoids data loss in a data object replication process. The system comprises a memory and a microprocessor coupled to the memory and programmed to: create an electronic data element comprising a first field having an identifier and a second field having a state of the identifier; set the second field of the data element to a state indicating that the electronic data element may be accessed and assigned; assign the identifier to one or more data objects; set a shared lock on the electronic data element; store the one or more data objects; and upon a commit of the storing of the one or more data objects, remove the shared lock and set the state of the identifier to indicate that the one or more data objects may be replicated.

The foregoing background and summary are not intended to be comprehensive, but instead serve to help artisans of ordinary skill understand the following implementations consistent with the invention set forth in the appended claims.

BRIEF DESCRIPTION OF THE DRAWINGS

The accompanying drawings show features of implementations consistent with the present invention and, together with the corresponding written description, help explain principles associated with the invention. In the drawings.

DETAILED DESCRIPTION

Figure 1:
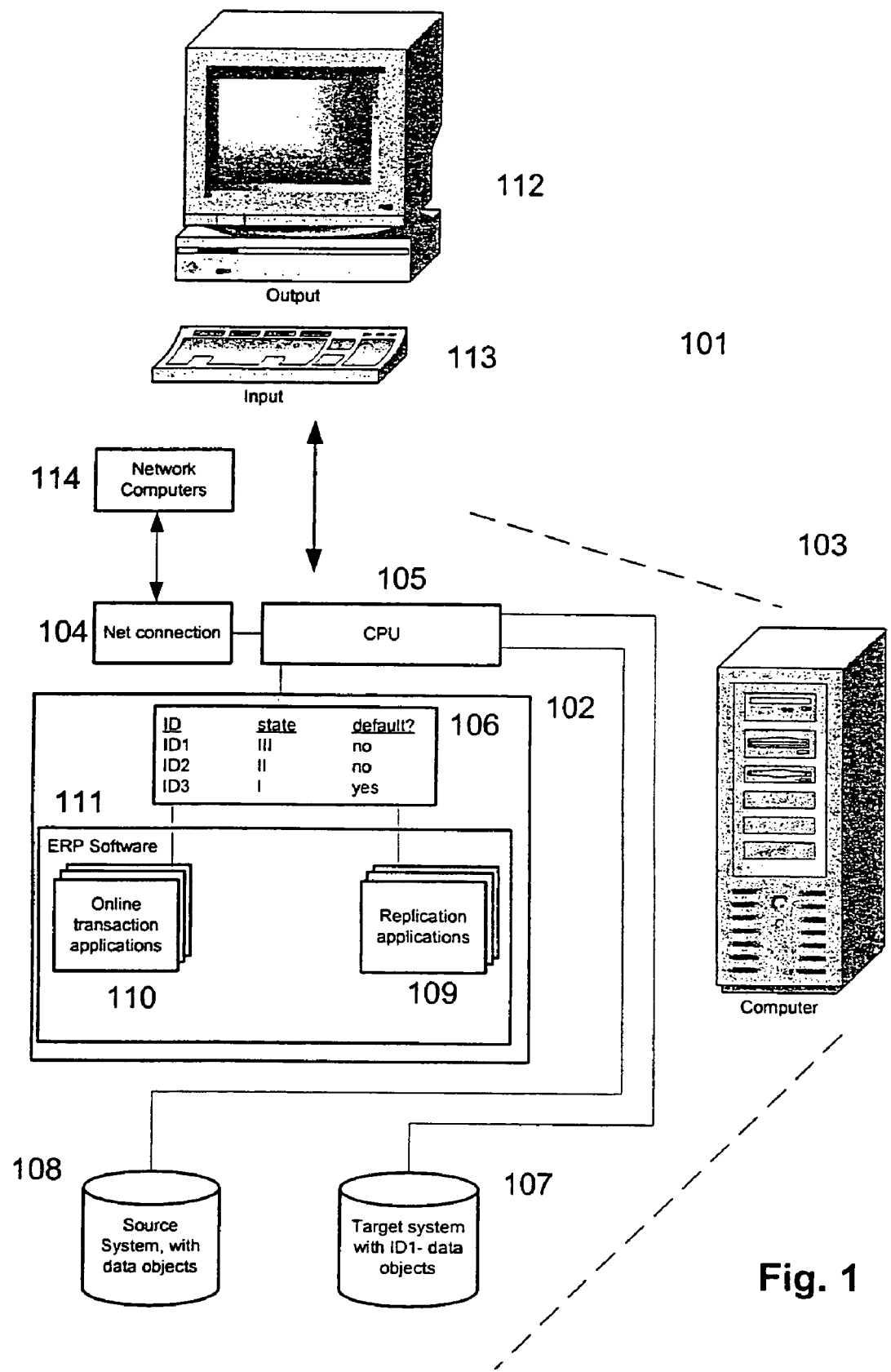
FIG. 1 is a schematic block diagram for illustrating an implementation of an electronic data element within a computer system consistent with the present invention.

The following description refers to the accompanying drawings in which, in the absence of a contrary representation, the same numbers in different drawings represent similar elements. The implementations in the following description do not represent all implementations consistent with the claimed invention. Instead, they are merely some examples of systems and methods consistent with the invention.

A computer system broadly refers to any stand alone computer such as a PC, a laptop, or a series of computers connected via a network, e.g. a network within a company or a series of computers connected via the Internet.

Computer systems and programs may be closely related. As used herein, phrases, such as "the computer provides," "the program provides or performs specific actions," or "a user performs a specific action," are used to express actions by a computer system that may be controlled by a program or to express that the program or program module may be designed to enable the computer system to perform the specific action or to enable a user to perform the specific action by means of a computer system.

The term "data object" broadly refers to any kind or type of data, e.g. numerical or textual data, image data, meta data, irrespective of whether the data are implemented as whole files or parts of files or fields in tables, and irrespective of whether they are stored in volatile memory or non volatile memory. As an example, data objects may be implemented as one or more fields of one or more tables, particularly of tables of a relational data base system. Processing of such data objects may comprise usual operations on data, such as, for example, calculating, amending, copying, deleting, and inserting.

The term "commit" broadly refers to a final stage in the successful completion of a previously started database change as part of handling a transaction in a computing or computer system.

The term "source/target system" broadly refers to any computer system, with or without software applications, in which data objects can be stored. Source and target systems may share devices. Consequently, source and target systems may be implemented on the same computer system.

A "data structure" broadly refers to a specialized format for organizing and storing data. Data structure types may include, for example, an array, a file, a record, a table, or a tree. Such data structures may be designed to organize data to suit a specific purpose so that it may be accessed and used in appropriate ways. In computer programming, a data structure may be selected or designed to store data or data objects for the purpose of working on it with various algorithms.

A "data element," within the scope of this disclosure, is data stored in a data structure. The electronic data element may also be interpreted as a data object as defined previously. The term electronic data element is used in order to distinguish over the data objects to be processed.

In computer programming languages, an electronic data element may be implemented as one or more lines of one or more tables, each line having one or more fields. In object orientated programming an electronic data element may be implemented by an instance of a class. The class then has at least a variable for an identifier (abbreviated as "ID") and a variable for the state.

A first embodiment of the electronic data element may be characterized in that said data element is implemented as one or more first fields and a second field of a table, whereby the one or more first fields contain an identifier and the second field contains information on the state for the identifier in the one or more first field. An alternative embodiment of the electronic data element is characterized in that said data element is implemented as one or more first fields in a first table and a second field in a second table, whereby the one or more first fields in the first table contain an identifier and the second field in the second table contains information on the state for the identifier in the one or more first fields of the first table.

The term "ID" broadly refers to a type of data which allows an identification of a data object or a set of data objects to be processed. It can be implemented, for example, as a number or a combination of alphanumerical characters. So, the electronic data element may be implemented as two fields of a table, in the first of which an ID is stored and in the second of which information on the state of the electronic data element are stored, e.g. three different data, e.g. "I" or "II" or "III", so defining the first, second or third state of the electronic data element.

One or more of the following operations may be allowed to be performed on the electronic data element: create an electronic data element having the first state; changing the first state to the second or third state; changing the second state to the third state; blocking or deblocking a change of state; setting/deleting a lock (see below), particularly a shared lock, on the ID; or requesting the state of the ID. The change of the state may be made dependent on predefinable conditions, e.g. whether a (shared) lock is set on the ID. Vice versa, the setting of a lock may be made dependent on the state, for example: if the state is the second state, no shared lock is allowed to be set on the ID. A change in state from III to I or II may be forbidden. A further variable may be available, which may have a state/content "default" or "non default", defining the respective electronic data element as a default element.

Setting the electronic data element into the second state may be implemented automatically by an independent program or manually by a user of the computer system. One or more electronic data elements may be set to the second state.

A change in state may be implemented by changing the entry in the field for the state information from a symbol (e.g. character, number, sign or combinations thereof) for the first or second state to a symbol for the third state.

A lock is a mechanism of a database or software application, which prevents a particular data from being accessed by other applications, as explained below. As is known in the art, a computer database system automatically sets database locks when it receives change statements (INSERT, UPDATE, MODIFY, DELETE) from a program. Database locks are physical locks on the database entries affected by these statements. Only a lock for an existing database entry can be set, since the lock mechanism uses a lock flag in the entry. These flags are automatically deleted in each database commit. This means that database locks can never be set for longer than a single database logical unit of work ("LUW").

Physical locks in the database system may therefore, in some circumstances, be insufficient for the requirements of locking data. In some applications locks must remain set for the duration of several LUW stages. They must also be capable of being handled by different work processes and even different applications. To comply with such requirements, so called logical locks have been created.

Unlike the database application, which sets physical locks, the setting of logical locks means that a locked data object is not physically locked in the database table. A logical lock may be implemented merely as an entry of a lock argument in a central lock table. The lock argument may be the primary key field of the data object to be locked, e.g. the ID. The logical lock is independent of database LUWs. It may be released either implicitly when a database update or a transaction ends, or explicitly, by deleting the entry in the central lock table. Consequently, the effectiveness of the logical locks may be influenced by cooperative application programming. Since the concept of logical locks uses no physical locks in the database tables themselves, all programs that use the same application objects may look in the central table themselves for any logical locks. There is no mechanism that automatically prevents a program from ignoring the locks in the lock table. At least two types of logical locks may be implemented: shared locks and excusive locks.

Shared locks (or read locks) set by an application (or program) may prevent data from being changed by other applications while being read by that application. Shared locks prevent other programs from setting an exclusive lock (write lock) to change the object. It does not, however, prevent other programs from setting further shared locks.

Exclusive locks (or write locks) may be set by an application to prevent data from being changed while that application is changing the data itself. An exclusive lock, as its name suggests, locks an data object for exclusive use by the program that sets it. No other program can then set either a shared lock or an exclusive lock for the same application object.

The concept of logical locks allows setting one or more locks for a data object as defined above, particularly for an ID, which lock exists for the duration of more than one LUW and which may be handled by more than one application.

The electronic data element may use both concepts as will be described below in more detail. Thus, "accessing" may comprise setting a shared and/or exclusive lock.

A first embodiment consistent with the present invention may comprise a stage of selecting one of the previous electronic data elements, which has the first state, and assigning it to one or more data objects and storing the one or more data objects.

When being in the first state, the electronic data element can be accessed by processes, which process a data object, and may be assigned to one or more data objects processed by any of the processes. Assigning an electronic data element to a data object may be implemented, for example, by storing a copy of it together with the data object or by storing a copy of it together with a second ID, which unambiguously identifies the particular data object, in a separate table. Alternatively, a link to the electronic data element may be added and stored. Further, a link to the data object or an identifier of it and the ID of the electronic data element may be stored in a separate table.

In the first state, a data processing operation is allowed to set a shared lock on the electronic data element.

If the electronic data element is in the second state, the electronic data element can still be read and assigned to the data objects. However, the electronic data element can not be accessed, i.e. setting a shared lock on that electronic data element is not allowed for that data processing operation.

If the electronic data element is in the third state, it can neither be accessed by a data processing operation nor be assigned to a data object. However, replicating processes can use this third state to select all data objects that have a particular electronic data element of the third state assigned. Because of the properties of the three states as described above, this (or these) particular third state electronic data element(s) may not be assigned nor accessed by any other data processing operation. Thus, by using replication processes that select data objects having third state electronic data elements assigned it is assured that no data object will be inadvertently omitted because of time gap problems as described in the background.

In order to put this into practice, the data processing operations have to be programmed accordingly.

A second embodiment consistent with the present invention further comprises setting the selected electronic data element to the third state if the storing of the assigned data objects is committed.

A third embodiment may further comprise creating a further electronic data element and setting it to the first state.

If an exclusive lock could be set, no shared loop exists any more on that ID. This means that the processing and storing of the data objects has been finalized and the data objects assigned to that ID can be replicated without the danger of a data loss.

Another embodiment may further comprise defining the further electronic data element as a default element and setting the previous electronic data elements to the second state.

A further embodiment may define the further electronic data element as a default and changing the state of a previous electronic data element, which has been defined as a default element, to the second state.

A further embodiment may select the default element for assigning it to the one or more data objects.

A still further embodiment may set a block having a reference to the process, which sets the block, on the electronic data element, where the block prevents the change of the state of the electronic data element to the third state if the state is the first or second state.

Additionally, a still further embodiment may comprise deleting the block, the reference of which points to that process, if the state is the first or second state and if the storing is committed.

Another embodiment may irreversibly block the change of the state of the electronic data element if the state is the third state.

The blocking may be implemented by setting a shared lock on the selected electronic data element. Deblocking may be implemented by deleting the shared lock.

In a further embodiment consistent with the present invention, the electronic data element may be implemented as a first table having one or more first fields, which contain an identifier, and wherein the shared lock is set on one or more of the first fields. A still further embodiment may provide that the first table has a second field that contains a state information. A still further embodiment may have a second table having a field that contains the state information linked to the first table.

A still further embodiment may implement the blocking by setting a shared lock on the electronic data element previous to assignment of the electronic data element to that data object. A still further embodiment may implement deblocking by deleting the shared lock as soon as the storing is committed.

A still further embodiment may, prior to setting the selected electronic data element to the third state if the storing of the assigned data objects is committed, checking whether a shared lock is set on the electronic data element and in case no shared lock is set performing the setting stage.

A still further embodiment comprises, upon a failure of the setting stage, waiting a predefinable time and retrying the checking stage. A still further embodiment may repeat the waiting stage a preselectable number of times. A still further embodiment may implement the checking stage by trying to set an exclusive lock on the electronic data element and in case the exclusive lock has been set, returning that no shared lock is set on the electronic data element.

A still further embodiment may perform the selecting and setting stages independently A still further embodiment may comprise, after creating a data element in the first state: creating a predefinable numbers of subprocesses for processing that correspondent to the number of data objects; performing the process for each data object in the corresponding subprocess; in the process which created the subprocesse, waiting until the corresponding number of shared locks has been set on the data element before changing the state of the data element to the second state; and processing and storing the data objects in the respective subprocesses.

A still further embodiment consistent with the present invention may replicate the data objects, the assigned data elements of which are set to the third state, to a target system.

A still further embodiment is characterized in that the electronic data element comprises a globally unique identifier ("GUID") or a time stamp. It is a term used for a number that programming generates to create a unique identity for an entity such as a Word document. GUIDs are widely used in products to identify interfaces, replica sets, records, and other objects. Different kinds of objects have different kinds of GUIDs—for instance, a Microsoft Access database uses a 16-byte field to establish a unique identifier for replication. And a time stamp contains date and time of a specific action performed on the data object. Date and/or time may be stored in separate fields of the ID part of the electronic data element. A still further embodiment may consecutively number the data elements in the third state. In a still further embodiment, the shared locks are logical read locks or data base read locks.

Embodiments consistent with the present invention may be used in enterprise resource planning software, for example, in the processing, storing and replicating of data objects of the financial area, e.g., booking, accounting, invoicing, receipt, and voucher objects.

FIG. 1 is a schematic block diagram for illustrating an implementation of an electronic data element within a computer system consistent with the present invention. FIG. 1 shows a computer system 101 comprising a computer 103 having a CPU 105, a working storage 102 (memory), in which an software application 111 is stored for being processed by CPU 105. Software application 111 comprises program modules 109, 110 for carrying out data replication and data processing consistent with the present invention. The electronic data elements may be implemented in a table 106 comprising a column for identifiers (abbreviated as "ID" and numbered consecutively, e.g. ID1, ID2, ID3, the latter being defined as default ID, abbreviated as "DID"), a column for the state and a column for the default quality. Table 106 may be stored in memory 102. The default quality may be implemented by adding—in general sense—"yes" in a field for the default status ("default?" in FIG. 1)). Computer System 101 may further comprise input means 113, output means 112 for interaction with a user, e.g. for starting the program modules and/or for data input, and general input/output means 104, including a net connection 114, for sending and receiving data. A plurality of computer systems 101 may be connected via the net connection 114 in the form of a network 113. In this case the network computers 113 may be used as further input/output means, including the use as further storage locations. Computer system 103 may further comprise a first storage means 107, for example a magnetic or optical disk drive, in which the data objects of the source system may be stored. A second storage means 108, for example a magnetic or optical disk drive, may be the storage means of the target system. Within the terms of this description, the source system in FIG. 1 is the computer system 103 minus storage means 107, and the target system is the computer system 103 minus the storage means 108. However, the target or source system may be any other network computer 114.

Program modules 110 may be processed by CPU 105 in order to carry out methods consistent with the present invention, and any data objects which are transferred to the modules 110 may be processed by these modules 110. The processing may comprise checking, within each module 110, whether a default ID ("DID") is available. In the example in FIG. 1, an ID "ID3" is defined as DID. Module 110 then checks whether the DID is in state I. This may be performed by querying table 106. An alternative method is trying to set a shared lock on that DID. In case the shared lock has been set, the DID is in state I. Then, the DID is assigned to the data objects processed by module 110, and the data objects are processed and stored on the storage means 108. After the commit of the storage of the data objects assigned to the DID, the state of the DID is set to III by making an entry in the table 106. If a shared lock has been set, the shared lock on the DID set by the particular module 110 is deleted.

Parallel to this process, a replication module 109 may be processed. Such a module checks whether there is an ID in state II. This check may be performed by querying table 106 or, alternatively, by trying to set an exclusive lock on one or more of the IDs contained in the central lock table 106. If the exclusive lock has been set on one of the IDs, the respective ID is in state III. Then, the data objects assigned to that ID–ID1 in FIG. 1—are replicated to the target system. The data objects may be changed by the replication process (e.g. compressed, or deprived of redundant or superfluous information).

Figure 2:
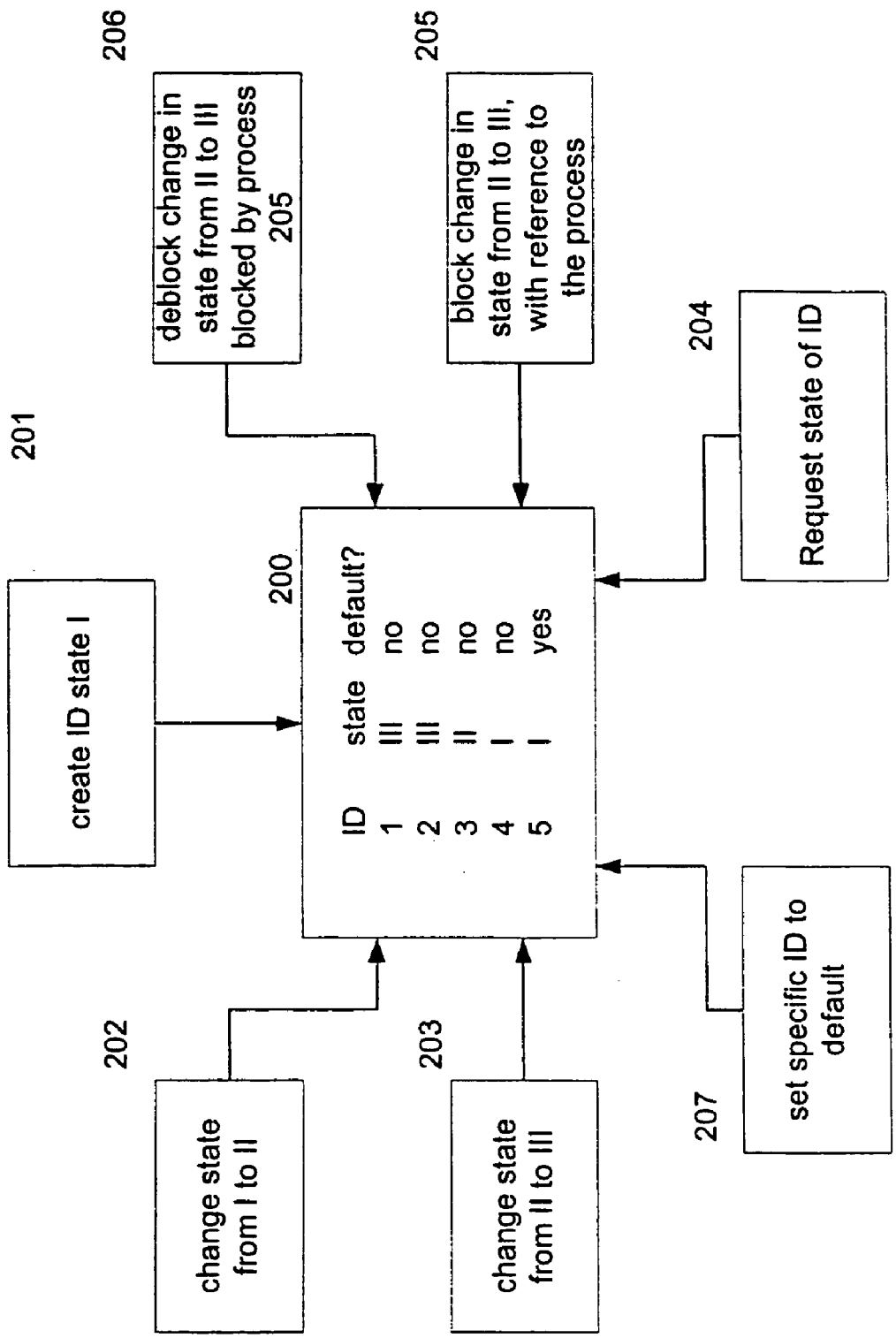
FIG. 2 is a block diagram of operations applicable on the electronic data element consistent with the present invention.

FIG. 2 is a block diagram of operations applicable on the electronic data element consistent with the present invention. FIG. 2 shows an implementation of an electronic data element in the form of five lines of a table 200 having three columns: ID, state, and default. This organization of table 200 can be interpreted as the structure of the electronic data element.

The following operations may be performed on the table 200, basically by independent processes. A new electronic data element in state I may be created by a process 201 by adding a new line with corresponding contents of the respective fields to the table 200. A process 202 may change the state from I to II. A process 203 may change the state of an electronic data element from II to III, if this change has not been blocked by a one or more processes such as process 205. A change in state from III to II or I is not allowed. The blocked change in state I or II may be deblocked by a process 206 for the own block. Blocking and deblocking may be implemented by setting and deleting a shared lock on an electronic data element. A specific ID may be defined as a default ID by a process 207 by a corresponding entry in the "default?" column. The process 207 assures that only one DID exist at a time. A process 204 may request the state of an electronic data element and may transfer it to another process. A plurality of electronic data elements may exist in each of the three states.

It is repeated in this context that the electronic data element could also be implemented by three tables having only one column, ID, state, default?, respectively, linked together by the respective lines, so as to behave as one table. A corresponding 2/1 combination is also possible. Additionally, the ID may comprise two or more fields of two or more columns, e.g. a number plus a date field plus a time field, with corresponding alternatives in splitting.

Figure 3:
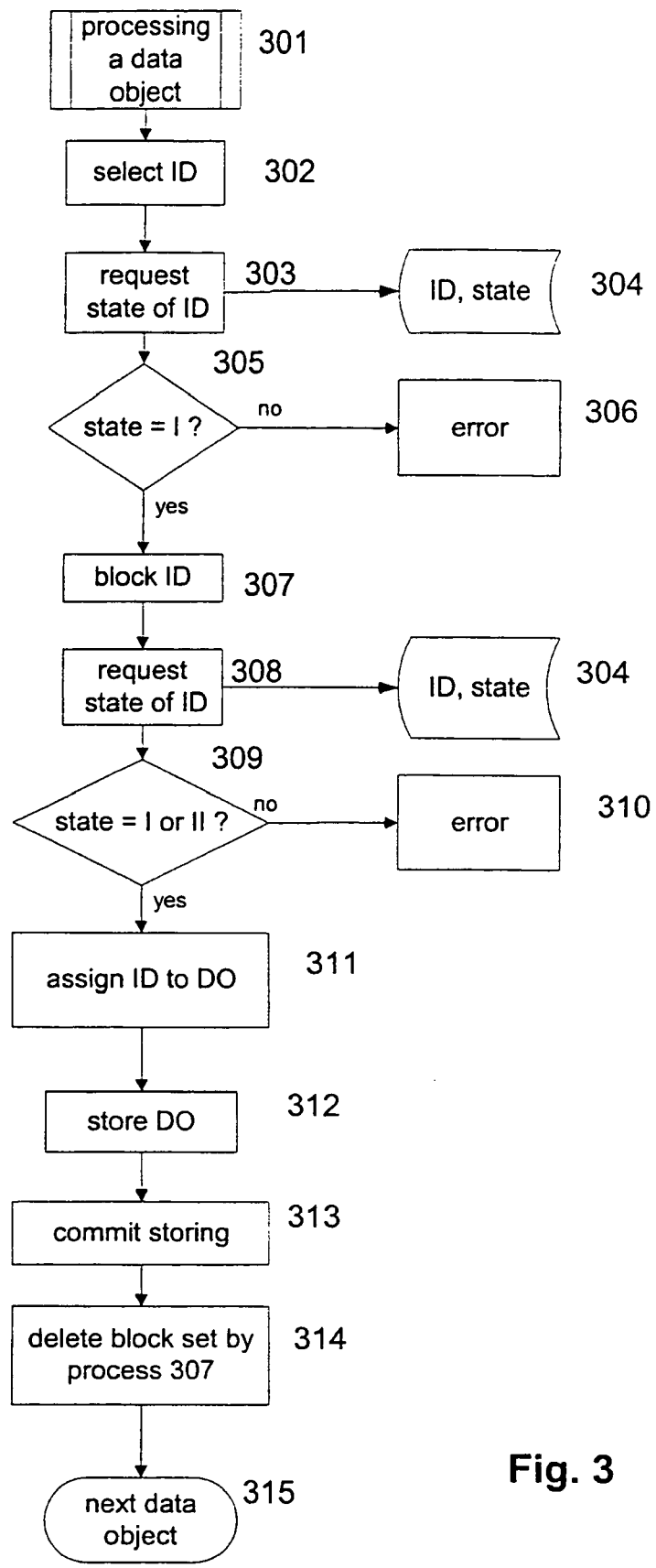
FIG. 3 is a flow diagram of a first implementation of a data processing operation using the electronic data element consistent with the present invention.

FIG. 3 is a flow diagram of a first implementation of a data processing operation using the electronic data element consistent with the present invention. In a stage 301, a software application (abbreviated as "SA") or program module processes a data object (abbreviated as "DO") in a computer system. In a stage 302 an ID, which has been created previously, is selected from a central ID table. In stage 303 the state of the ID is requested. If the state is not equal to I, the process branches in stage 305 to an error process 306, which itself may go back to stage 302. Otherwise the ID is blocked in stage 307. Then, the state of the ID is requested again in stage 308. If the state is I or II, the ID is assigned to the data object processed by the SA in stage 311. Otherwise, the process branches to an error process 310. The repeated request of the state assures that a possible change in the state of the ID, which might be caused by an independent, parallel running process, is taken into account. In such a case, the selected ID is not allowed to be assigned to the data object. Instead, another ID has to be selected, or the process has to be terminated.

The DO is then stored in stage 312. If the storing is committed in stage 313, the block on the ID set in stage 307 is deleted. The process 301 then terminates or restarts with a new DO.

Figure 4:
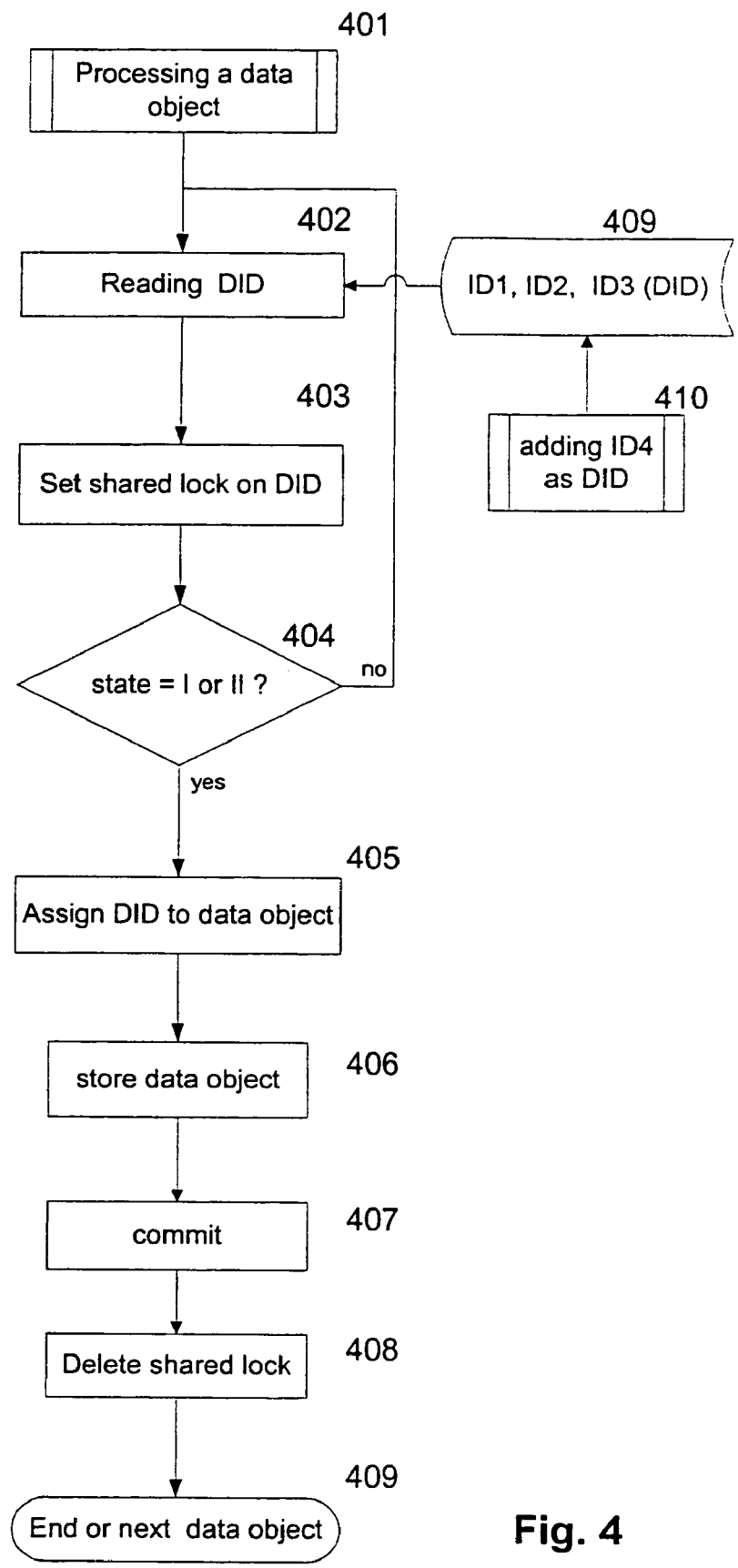
FIG. 4 is a flow diagram of a second implementation of a data processing operation using the electronic data element using default IDs consistent with the present invention.

FIG. 4 is a flow diagram of a second implementation of a data processing operation using the electronic data element using default IDs consistent with the present invention. In a stage 401 a software application or program module (abbreviated as "SA") processes a data object in a computer system. The SA reads in a stage 402 from a table 409 the actual DID in the computer system. The SA then tries to set in stage 403 a shared lock on said DID. In stage 404 it is checked, whether the state of the DID is I or II. If no, i.e. if the state is III, the SA returns to stage 402. This loop may be run through a predefinable number of times and may, in case no lock could be set, then be broken off with an error message. The setting of the shared lock in 403 and the check whether it is successfully set may be implemented as one "atomic" stage. This means that both stages are executed essentially at the same time or, in other words, the time gap between both stages is essentially zero. If the state is I or II, the SA assigns the DID to the processed data object in stage 405 and stores the data object in stage 406. After the commit of the storing in stage 407 the shared lock set in 403 is deleted in stage 408. In the stage 407 in may be included in a loop that the SA waits for the commit of the storing process from the system routine, which writes the data object to the storage device. Again, this loop may be run through a predefinable number of times and may, in case of no commit, then be broken off with an error message.

After stage 408, the SA may be terminated or a further data object may be selected for processing in stage 409.

Parallel to this SA another software application 410 may add a further ID to the ID table 409 and may define this new ID as the default ID.

Figure 5:
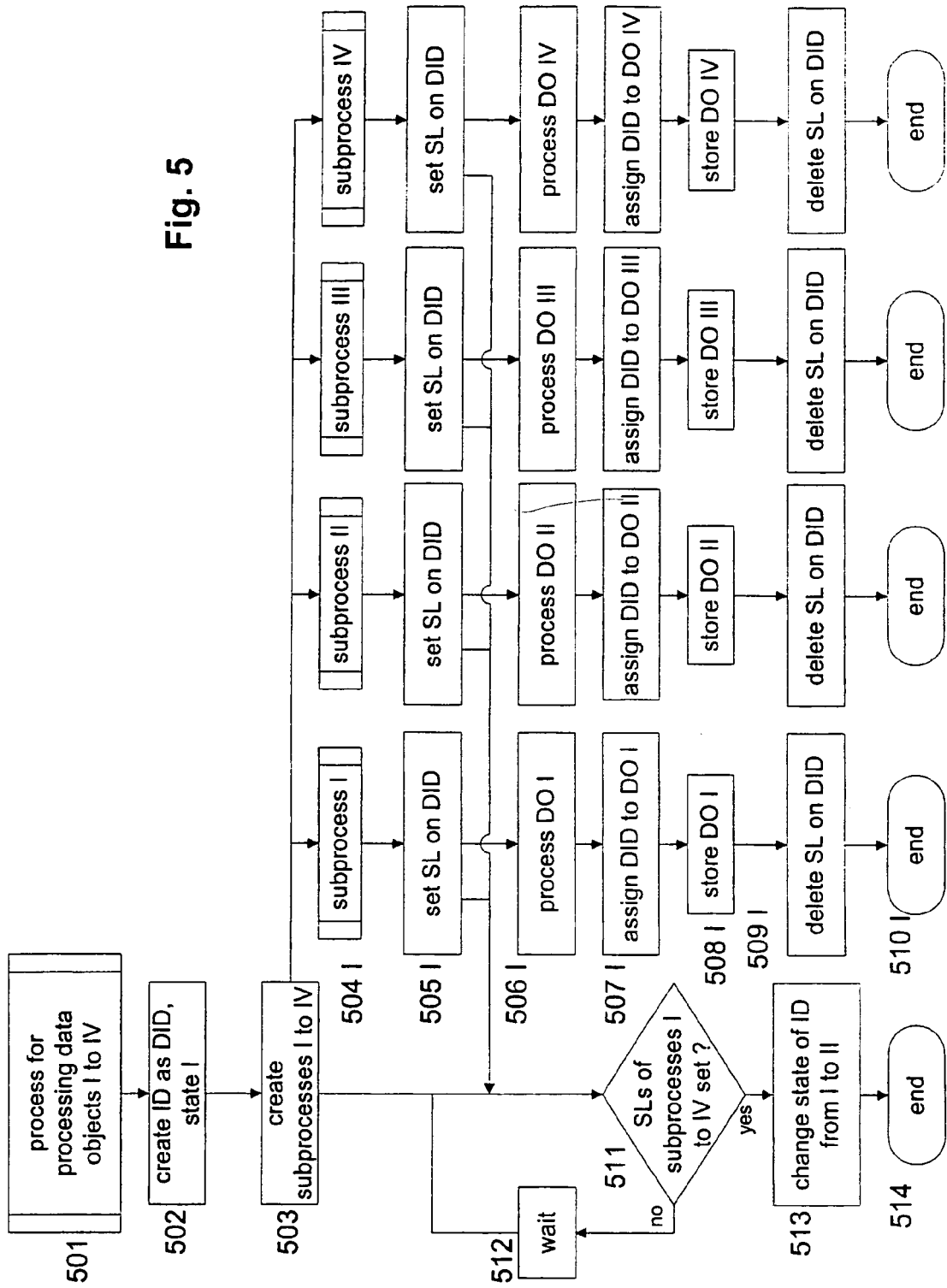
FIG. 5 is a flow diagram of a third implementation of a data processing operation using the electronic data element for processing at least two DO in parallel consistent with the present invention.

FIG. 5 is a flow diagram of a third implementation of a data processing operation using the electronic data element for processing at least two DO in parallel consistent with the present invention. In a stage 501 a software application or program module (abbreviated as "SA") processes four data objects I to IV in a computer system. In a stage 502 the SA creates an ID as DID and sets it to state I. In a next stage 503 the SA 501 creates four subprocesses I to IV for further processing the DO I to IV in a respective subprocess. The subprocesses ("SP") I to IV run independently from each other and parallel.

For simplicity, only the subprocess 504 I is described in the following section. SP I sets in a stage 505 I a shared lock on the DID. This prevents the DID from being set to state III. If the shared lock has been set, a corresponding message is sent to the SA. The DO is then processed in stage 506 I, the DID is assigned to the DO in stage 507 I, the DO is stored in stage 508 I and after the commit of the storing process, the shared lock set on the DID by the SP I is deleted. The SP then ends in stage 510 I. The main process SA 501 waits in the loop 511, 512 until all subprocesses have successfully set the respective shared locks. If this condition is fulfilled, the SA changes the state of the DID from I to II in stage 513. This means that from that time on the DID can not be accessed by any other process, i.e. no other process can use. However, the assignment of the DID by processes, which have already accessed the DID, i.e. SP I to IV, is not restricted. The SA then ends in stage 514.

Figure 6:
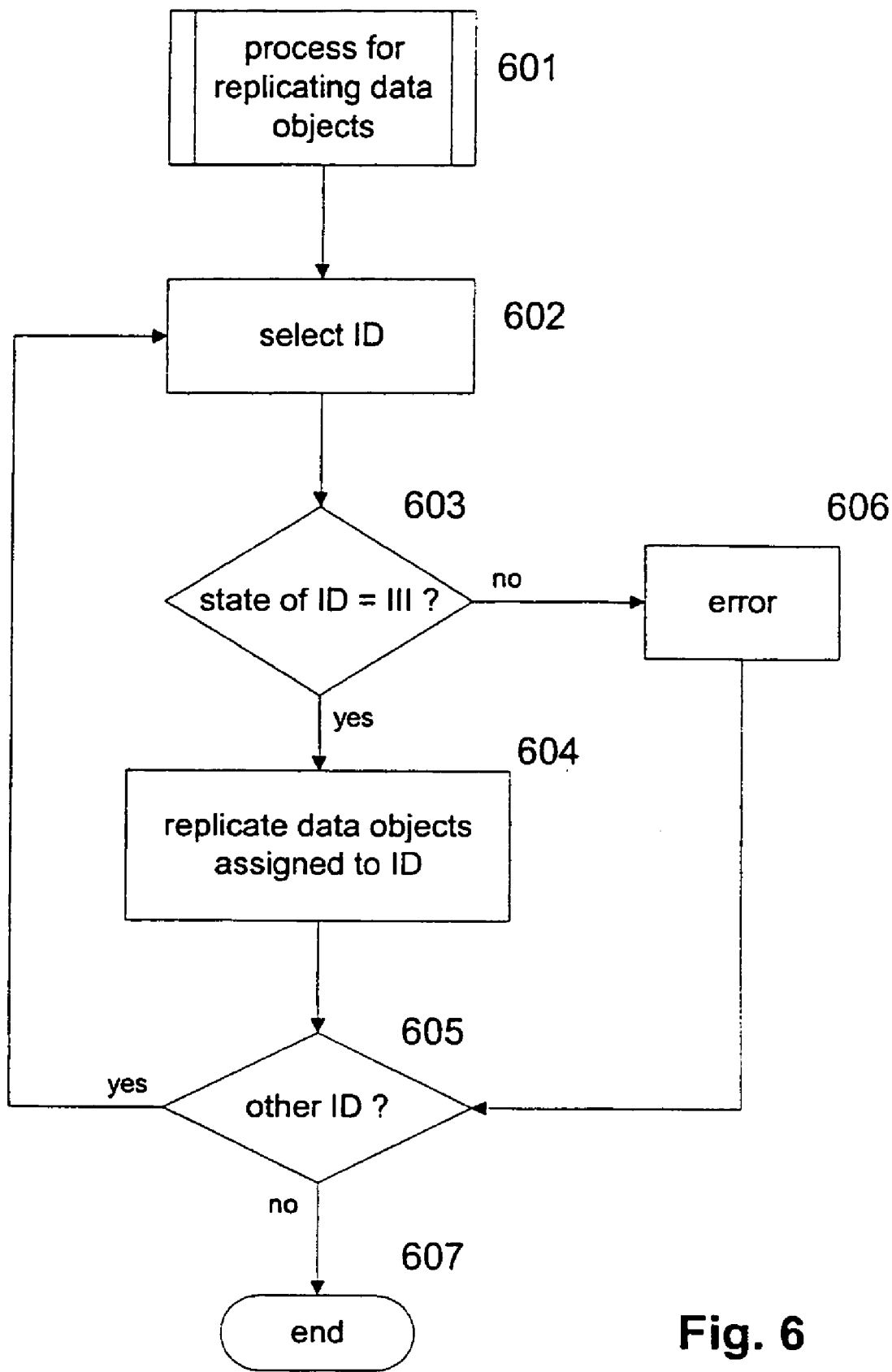
FIG. 6 is a flow diagram of a first implementation of a data replicating process using the electronic data element consistent with the present invention.

FIG. 6 is a flow diagram of a first implementation of a data replicating process using the electronic data element consistent with the present invention. A replication process 601 selects an ID from an ID table in stage 602. In stage 603 it is checked, whether the selected ID is in state III. If yes, all stored data objects, which have that ID assigned are replicated from their source system to a target system in stage 604. If no, the replication process branches to an error routine 606, which may create an error message and which returns to stage 602 or end the process. If all data objects have been replicated, the process checks in stage 605 whether data objects of an other ID are to be replicated. IF yes, it branches back to stage 602, otherwise it ends in stage 607.

Figure 7:
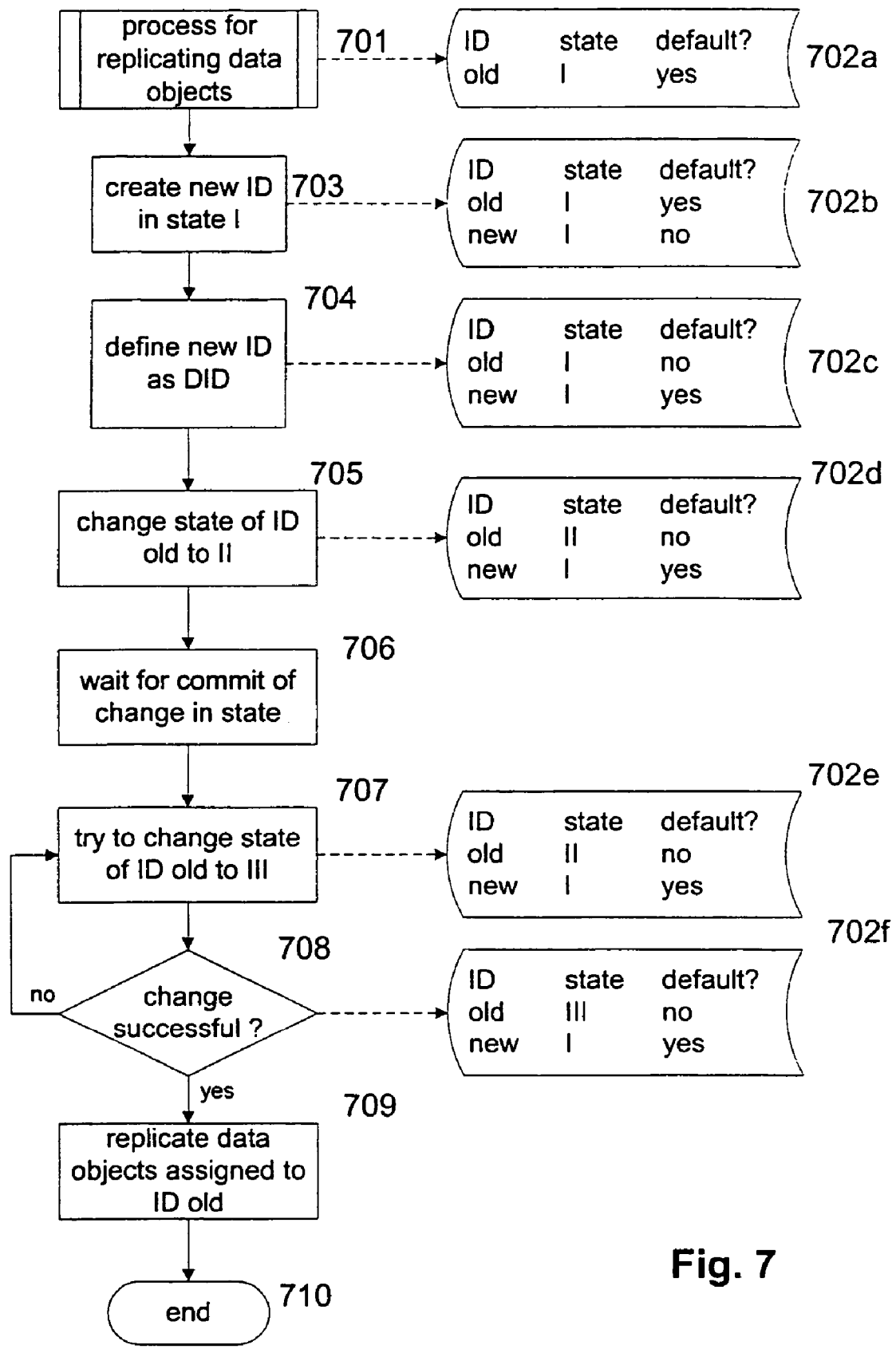
FIG. 7 a flow diagram of a second implementation of a data replicating process using the electronic data element consistent with the present invention.

FIG. 7 a flow diagram of a second implementation of a data replicating process using the electronic data element consistent with the present invention. In the process of FIG. 7 a software application (SA) 701, which may run in parallel to processes for processing data objects, starts in a state at which an ID (the expression "electronic data element" and "ID" are used synonymously) "old" is in a state I and defined as default ID according to table 702a in order to replicate one or more data objects. Table 702 comprises three columns. The first contains in its field information on the ID, i.e. the ID, the second on the state, i.e. "I" or "II" or "III", the third on the default property, i.e. "yes" or "no". In 702a the table contains one electronic data element: consisting of the fields of the table containing "old", "I", "yes". SA creates in stage 703 a new ID "new" and sets it to state I, table 702b. In stage 704, the new ID is defined as default, what means that "yes" is entered in the corresponding field of the default? column. At the same time, the old ID is redefined as non default by entering "no" into the corresponding default? field, 702c. In stage 705, the state of the old ID is changed from I to II.

Figure 7A:
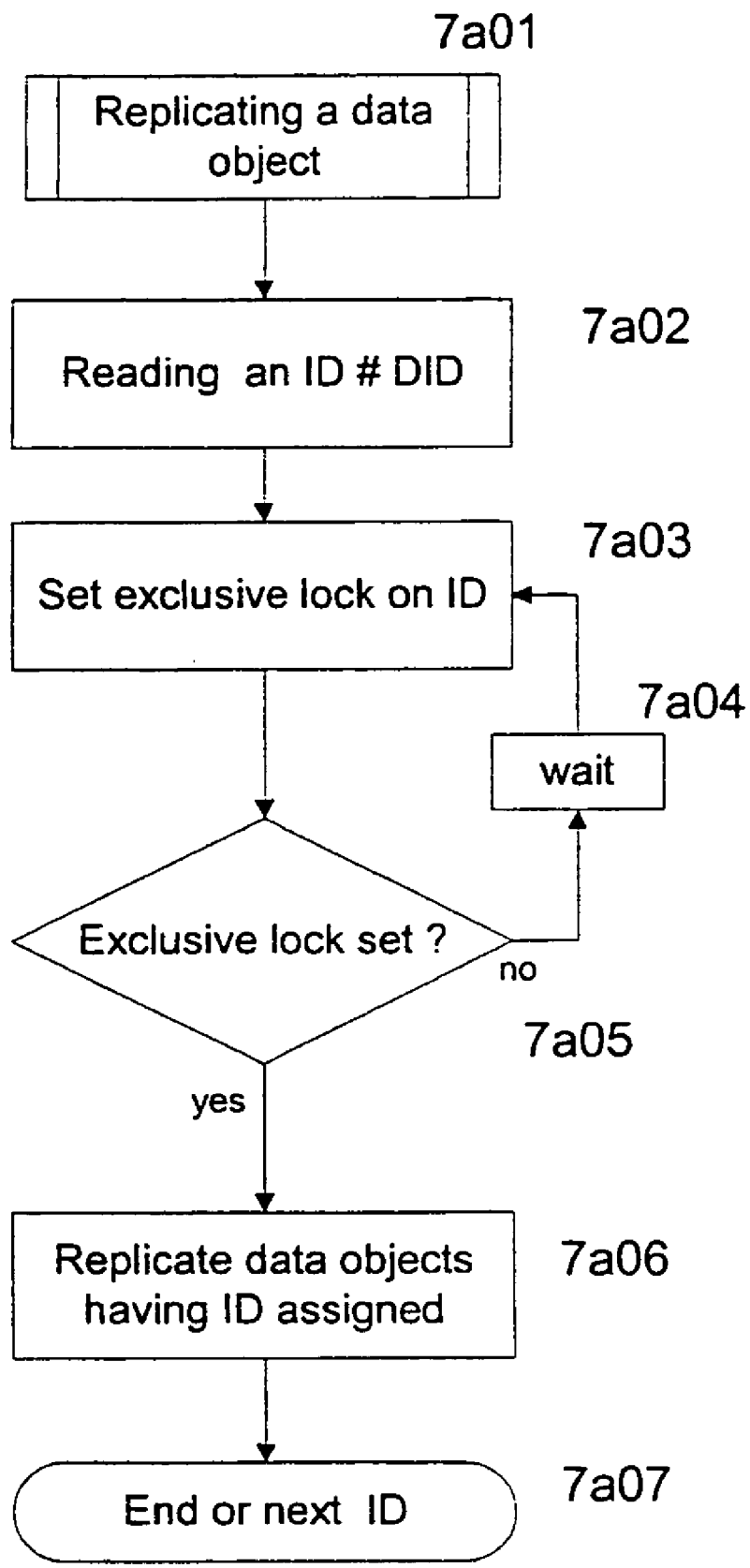
FIG. 7a is a flow diagram of a further implementation of a data replicating process using the electronic data element consistent with the present invention.

FIG. 7a is a flow diagram of a further implementation of a data replicating process using the electronic data element consistent with the present invention. A replication application 7a01 reads in stage 7a02 an ID, which is not equal to the DID, from an ID table in the computer system and tries to set an exclusive lock on said ID in stage 7a03. The application then checks in stage 7a05 whether the exclusive lock could be set. In case no, the application returns after waiting a predefinable time in stage 7a04 to stage 7a03. The loop may be broken off after a predefinable number of unsuccessful attempts. In case yes of stage 7a05, the application replicates in stage 7a06 the data objects, which have the ID assigned, from their source system to a target system. After that the replication application may be terminated or an other ID may be selected in stage 7a07.

Figure 8:
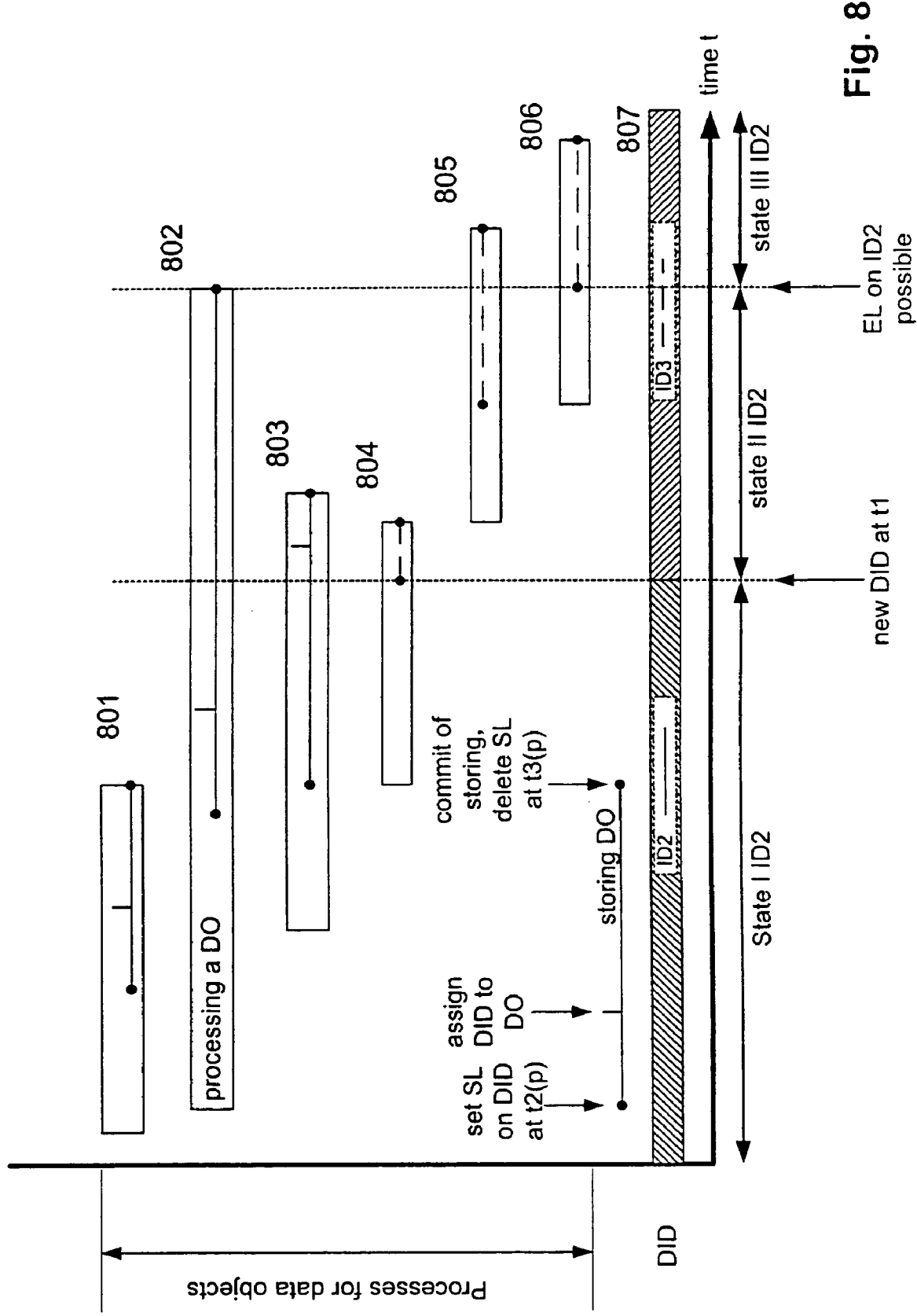
FIG. 8 is an illustration of the chronological sequence of the states of the electronic data element and of stages performed by several independent processes consistent with the present invention.

FIG. 8 is an illustration of the chronological sequence of the states of the electronic data element and of stages performed by several independent processes consistent with the present invention. Six software applications 801 to 806 process each one or more different data objects (abbreviated "DO"). At the starting time of processes 801 to 804, the ID2 is the default ID. From the time t1 on, the new ID ID3 is the default ID and the state of the ID2 is changed from I to II. From then on, no process can access ID2 and use it for assigning it to the DO. The checking of whether the ID is in state I or II can be implemented by querying the respective state field of the electronic data element if this is implemented as a line of a table as described above. The change in state may be performed by an independent process, not shown in the figure. Each of the processes reads the actual DID (comp. FIG. 4). At a time t2(p), which depends on the process, a process 801 to 806 blocks a change of the state from I,II to III of the actual valid DID by setting a shared lock (abbreviated "SL") on the actual valid DID, which is ID2 in the for the processes 801 to 803 and ID3 for the processes 804 to 806. After setting the SL, the processes 801 to 806 assign the respective DID, on which they have set the SL to the data objects and store the data objects to the source system. Consequently, process 803 assigns still ID2 to its DO although ID2 is at the time of assignment not the actual valid DID. The processing of the DO and the storing takes a certain period of time, depending on the DO and process. This time ends at a time t3(p), at which the commit of the storing routine is received. After that receipt, the processes 801 to 806 delete the respective SL.

From the time at which the deletion of the last SL on ID2 has been committed (process 802), the state of ID2 can be set to III. Whether this is possible can be checked by trying to set an exclusive lock on the ID. If an exclusive lock can be set successfully, the state can be changed to II. From then on, the DO having that ID assigned can be replicated.

In further embodiments of the inventive method, a combination of the processes according to FIGS. 3 and 6, 4 and 7/7a, respectively, may be installed and run in parallel on a computer system.

The use of the inventive method end electronic data element, as described in the preceding sections, assures, that no data object can be overlooked by replicating applications.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

To provide for interaction with a user, the invention can be implemented on a computer system having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or haptic feedback; and input from the user can be received in any form, including acoustic, speech, or haptic input.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data.

Generally, a computer will also include, or be operatively coupled to receive data from or transfer data to, or both, one or more mass storage devices (storage means) for storing data, e.g., magnetic, magneto-optical disks, or optical disks. Information carriers suitable for embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

Computer programs based on the written description and flow charts of this invention are within the skill of an experienced developer. The various programs or program modules can be created using any of the techniques known to one skilled in the art or can be designed in connection with existing software. For example, programs or program modules can be designed in or by means of ® Java, C++, HTML, XML, or HTML with included Java applets or in SAP R/3 or ABAP. One or more of such modules can be integrated in existing e-mail or browser software.

Modifications and adaptations of the present invention will be apparent to those skilled in the art from consideration of the specification and practice of the invention disclosed herein. The foregoing description of an implementation of the invention has been presented for purposes of illustration and description. It is not exhaustive and does not limit the invention to the precise form disclosed. Modifications and variations are possible in light of the above teachings or may be acquired from the practicing of the invention. For example, the described implementation includes software, but systems and methods consistent with the present invention may be implemented as a combination of hardware and software or in hardware alone. Additionally, although aspects of the present invention are described for being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM. It is intended that the specification and examples be considered as exemplary only, with a true scope and spirit of the invention being indicated by the following claims.

What is claimed is:

1. A method of avoiding data loss in a data object replication process, comprising:
   creating an electronic data element comprising a first field having an identifier and a second field having a state of the identifier;
   setting the second field of the data element to a state indicating that the electronic data element may be accessed and the identifier assigned;
   assigning the identifier to one or more data objects when the state of the identifier indicates that assigning the identifier is possible, wherein the state of the identifier also indicates that the one or more data objects assigned the identifier are not yet ready for replication;
   setting a shared lock on the electronic data element;
   storing the one or more data objects; and
   upon a commit of the storing of the one or more data objects, removing the shared lock and setting the state of the identifier to indicate that the one or more data objects are ready for replication.

2. The method of claim 1, wherein the state of the identifier may be set to:

a) a first state, in which said electronic data element may be accessed by one or more data object processing operations and whereby said identifier is assignable to one or more data objects,
b) a second state, in which said electronic data element may not be accessed by one or more data object processing operations and whereby said identifier is assignable to one or more data objects, or
c) a third state, in which said electronic data element may not be accessed by one or more data object processing operations and whereby said identifier is not assignable to one or more data objects.

3. The method of claim 2, further comprising setting the state of the second field of the electronic data element to the second state.

4. The method of claim 2, wherein upon a commit the state of the second field of the electronic data element is set to the third state.

5. The method of claim 4, further comprising replicating the one or more data objects assigned to the identifier set to the third state.

6. The method of 5, further comprising creating a second electronic data element and setting it to the first state.

7. The method of claim 6, further comprising setting the second electronic data element as the default data element.

8. The method of claim 7, further comprising setting a previously defined electronic data element to the second state.

9. The method of claim 4, further comprising irreversibly blocking the changing of the state of the electronic data element.

10. A system for avoiding data loss in a data object replication process, comprising:
    a memory; and
    a microprocessor coupled to the memory and programmed to:
      create an electronic data element comprising a first field having an identifier and a second field having a state of the identifier;
      set the second field of the data element to a state indicating that the electronic data element may be accessed and the identifier assigned;
      assign the identifier to one or more data objects when the state of the identifier indicates that assigning the identifier is possible, wherein the state of the identifier also indicates that the one or more data objects assigned the identifier are not yet ready for replication;
      set a shared lock on the electronic data element;
      store the one or more data objects; and
      upon a commit of the storing of the one or more data objects, remove the shared lock and set the state of the identifier to indicate that the one or more data objects are ready for replication.

11. The system of claim 10, wherein the state of the identifier may be set to:

a) a first state, in which said electronic data element may be accessed by one or more data object processing operations and whereby said identifier is assignable to one or more data objects,
b) a second state, in which said electronic data element may not be accessed by one or more data object processing operations and whereby said identifier is assignable to one or more data objects, or
c) a third state, in which said electronic data element may not be accessed by one or more data object processing operations and whereby said identifier is not assignable to one or more data objects.

12. The system of claim 11, wherein the microprocessor is further programmed to set the state of the second field of the electronic data element to the second state.

13. The system of claim 11, wherein the microprocessor is further programmed to, upon a commit, set the state of the second field of the electronic data element is set to the third state.

14. The system of claim 13, wherein the microprocessor is further programmed to replicate the one or more data objects assigned to the identifier set to the third state.

15. The system of claim 14, wherein the microprocessor is further programmed to create a second electronic data element and setting it to the first state.

16. The system of claim 15, wherein the microprocessor is further programmed to set the second electronic data element as the default data element.

17. The system of claim 16, wherein the microprocessor is further programmed to set a previously defined electronic data element to the second state.

18. The system of claim 13, wherein the microprocessor is further programmed to irreversibly block the changing of the state of the electronic data element.

19. A system that avoids data loss in a data object replication process, the system comprising:

means for creating an electronic data element comprising a first field having an identifier and a second field having a state of the identifier;

means for setting the second field of the data element to a state indicating that the electronic data element may be accessed and the identifier assigned;

means for assigning the identifier to one or more data objects when the state of the identifier indicates that assigning the identifier is possible, wherein the state of the identifier also indicates that the one or more data objects assigned the identifier are not yet ready for replication;

means for setting a shared lock on the electronic data element;

means for storing the one or more data objects;

means for removing the shared lock, upon a commit of the storing of the one or more data objects; and means for setting the state of the identifier to indicate that the one or more data objects are ready for replication.

* * * * *